Patented June 16, 1931

1,810,039

UNITED STATES PATENT OFFICE

FRITS ELLINGER, OF THE HAGUE, NETHERLANDS, ASSIGNOR TO MIJNBOUW EN HANDELSMAATSCHAPPIJ "WONOH GEDEH", OF THE HAGUE, NETHERLANDS

PROCESS FOR OBTAINING IODINE AS IODIDE FROM IODINE-CONTAINING ADSORPTION CARBON

No Drawing. Application filed March 7, 1929, Serial No. 345,230, and in the Netherlands June 12, 1928.

In my U. S. Patent No. 1,604,153, granted Oct. 26, 1926, a process is described for obtaining alkali iodide from iodine-containing adsorptive carbon, according to which the carbon is treated with an approximately theoretical solution of an alkali sulphite and an alkali carbonate or a caustic alkali. By this treatment iodide is formed by the sulphite, because when mixing with an excess of sodium carbonate solution only, it is shown by experiment that a large part of the iodine is still found free after 24 hours. The formation therewith of iodide and iodate takes place exceedingly slowly.

According to the invention, a fairly quantitative recovery of the iodine as iodide with a very small percentage of iodate, which is practically of no importance, is obtained by a hot treatment of iodine-containing carbon with a small excess of a sodium carbonate solution without admixture of reducing agents.

When iodine-containing carbon is boiled for an hour with a small excess of sodium carbonate solution, it appears that only iodide is formed with only a little more than traces of iodate and that the charcoal therefore works as a sufficient reducing agent. The question arises, whether an iodate was formed as an intermediate product which was subsequently reduced by the carbon to iodide. This does not seem to be the case, as the following experiment shows:

Sodium iodate was boiled for an hour with adsorptive carbon and a small excess of sodium carbonate solution in order to try to reduce the iodate to iodide; the result was perfectly negative. No trace of iodide was formed. It therefore appears from this experiment that in the reaction mixture according to the invention no iodate is reduced to iodide. It is possible that by the action of hot sodium carbonate solution the first formed (hypothetical) hypo-iodite is reduced by the carbon to iodide. Just as when dissolving chlorine in alkalies, hypochlorites are obtained, which have a stronger oxidizing action than chlorates, and which are converted into chloride and chlorate by boiling, an instable hypo-iodite seems to be formed from the iodine, which, under ordinary circumstances is converted into iodide and iodate, but in the presence of finely porous carbon yields oxygen to the carbon, and is reduced by the carbon to iodide.

The following experiments were made:

1. 25 grams of adsorptive carbon, containing 3.891 grams of adsorbed iodine, were boiled for an hour with 56 grams of a 10% solution of crystallized sodium carbonate.

After filtration the carbon was washed several times with pure water, the first time with 165 c. c. and then every time with 55 c. c. of warm water heated to a temperature of about 80° C. and all the filtrates were analyzed for iodine.

2. 25 g. of adsorptive carbon, were mixed with 3.891 g. of adsorbed iodine, were mixed with a solution as described in U. S. Patent No. 1,604,153 of approximately the theoretical quantity of crystallized sodium carbonate plus sodium sulphite, and treated with this at ordinary temperature. After filtration the carbon was washed just as in Experiment 1, but with water at ordinary temperature (about 28° C.) and the whole filtrate analyzed for iodine.

The results of both the experiments were as follows:

|  | Expt. I | Expt. II |
|---|---|---|
|  | Per cent | Per cent |
| 1. Filtrate+first washwater (165 c. c.) | 91.7 | 90.4 |
| 2. After further washing with 55 c. c. in Experiment 1 with water of about 80° C., for Experiment 2, water of ordinary temperature, the total iodine obtained was | 95.3 | 94.7 |
| 3. After further washing with 55 c. c., entirely as in 2, total iodine | 97.6 | 97.0 |
| 4. After further washing with 55 c. c., entirely as in 3 | 98.5 | 98.2 |
| 5. As in 4 | 99.1 | 98.9 |
| 6. As in 5 | 99.5 | 99.3 |
| 7. As in 6 | 99.9 | 99.7 |

It follows therefrom that one can extract the iodine just as well with warm sodium carbonate solution as with a mixture of sodium carbonate and sulphite at ordinary temperature.

In carrying out the invention the iodine-containing charcoal is boiled with a 10% solution of crystallized sodium carbonate, using 20% excess above the quantity equivalent to the iodine in the charcoal. The charcoal is then filtered and further washed with warm water heated to a temperature of about 80° C. For the first washing approximately 42 liters of washwater for every kilo of iodine, originally present in the carbon, is taken and for the subsequent washings 14 liters of washwater for every kilo of iodine, originally present.

In order to prevent much evaporation one can mix the original filtrate with the filtrates of the first two washings and evaporate the mixture, and mix the filtrates of the third to the seventh washing, with a little more than the theoretical quantity of copper sulphate and sodium sulphite, preferably after first having neutralised the liquids, for obtaining cuprous iodide therefrom, or one may use the last filtrates for making the carbonate solutions or as washwaters for new batches.

What I claim is:

1. Process for obtaining iodine as iodide from iodine-containing carbon, which comprises extracting the iodine from the carbon at approximately 100° C. with an excess of a sodium carbonate solution, filtering the extract and washing the carbon with hot water.

2. In a process for obtaining iodine from iodine-containing carbon, the step which comprises extracting the iodine from the carbon at approximately 100° C. with an excess of a sodium carbonate solution.

FRITS ELLINGER.